Feb. 1, 1949.   W. H. HOWE   2,460,503
APPARATUS FOR MEASURING LIQUID
LEVEL OR SPECIFIC GRAVITY
Filed Feb. 26, 1945   3 Sheets-Sheet 1
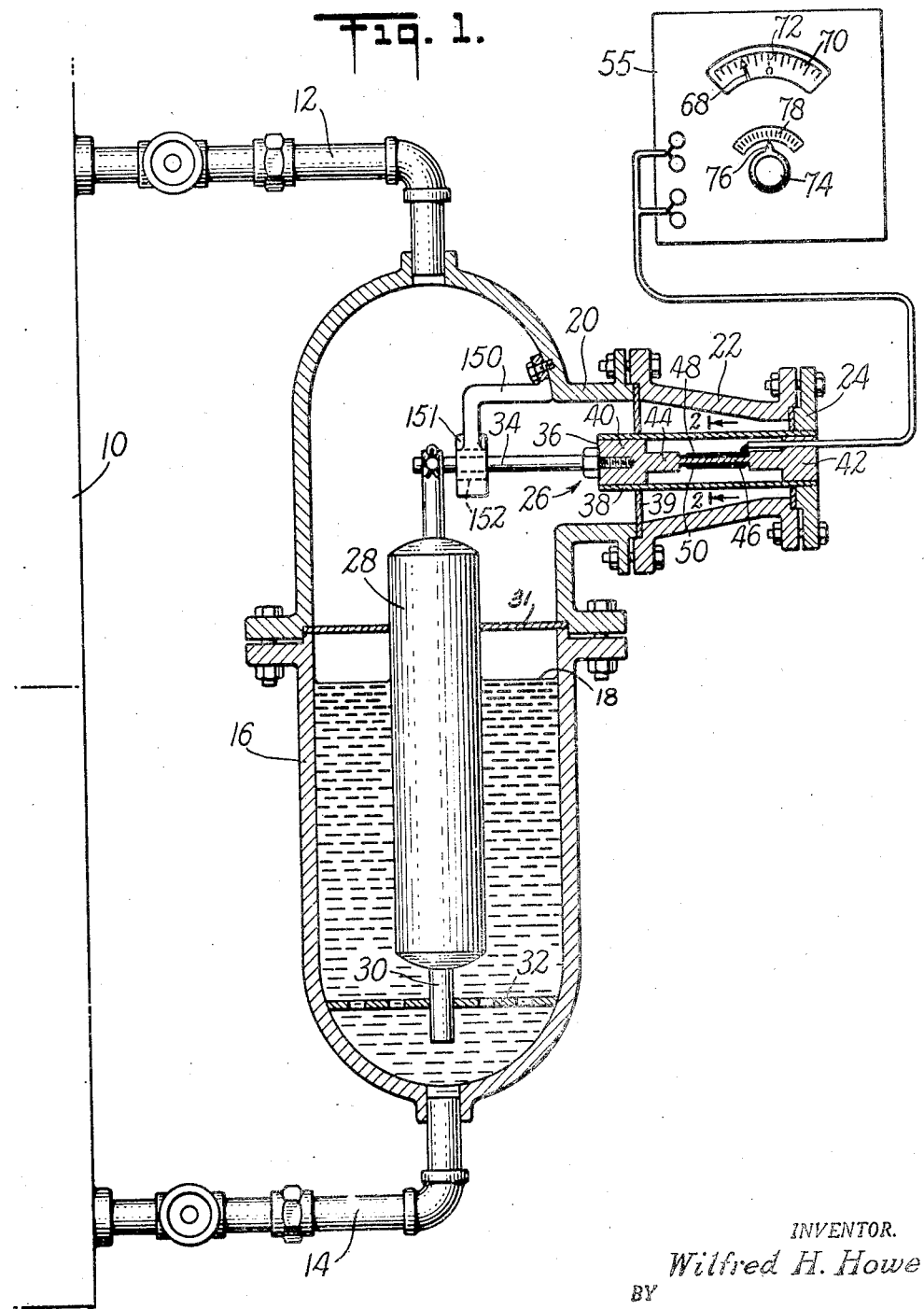
INVENTOR.
Wilfred H. Howe
BY
Blair, Curtis + Hayward
ATTORNEYS Feb. 1, 1949.  W. H. HOWE  2,460,503
APPARATUS FOR MEASURING LIQUID
LEVEL OR SPECIFIC GRAVITY
Filed Feb. 26, 1945  3 Sheets-Sheet 2
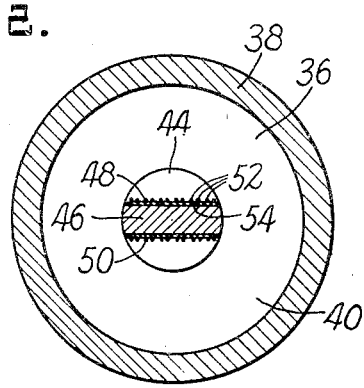
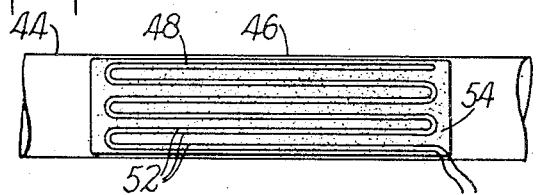
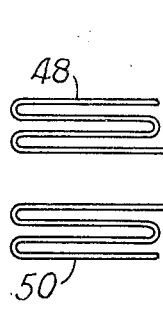
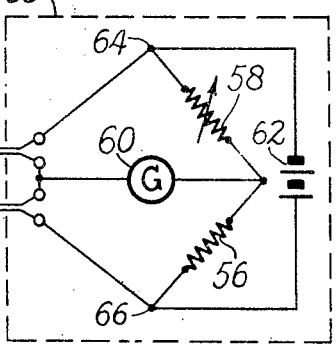
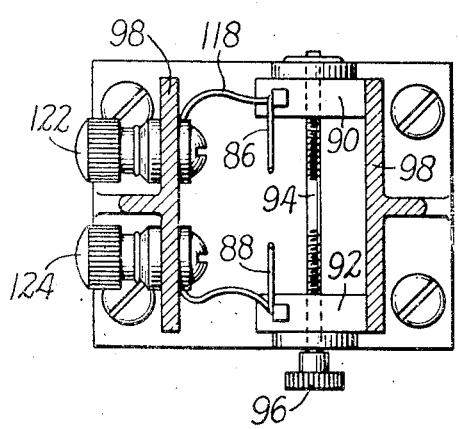
INVENTOR.
Wilfred H. Howe
BY
Blair, Curtis + Hayward
ATTORNEYS

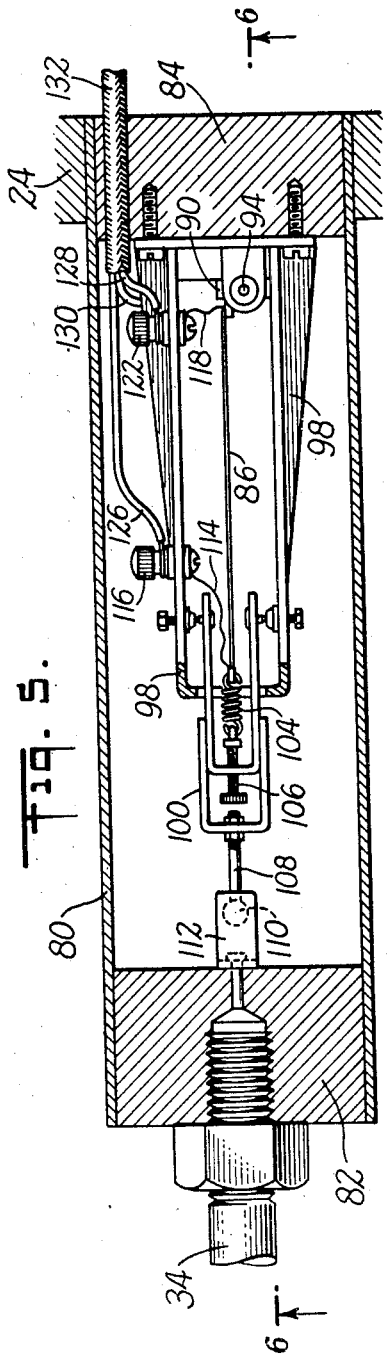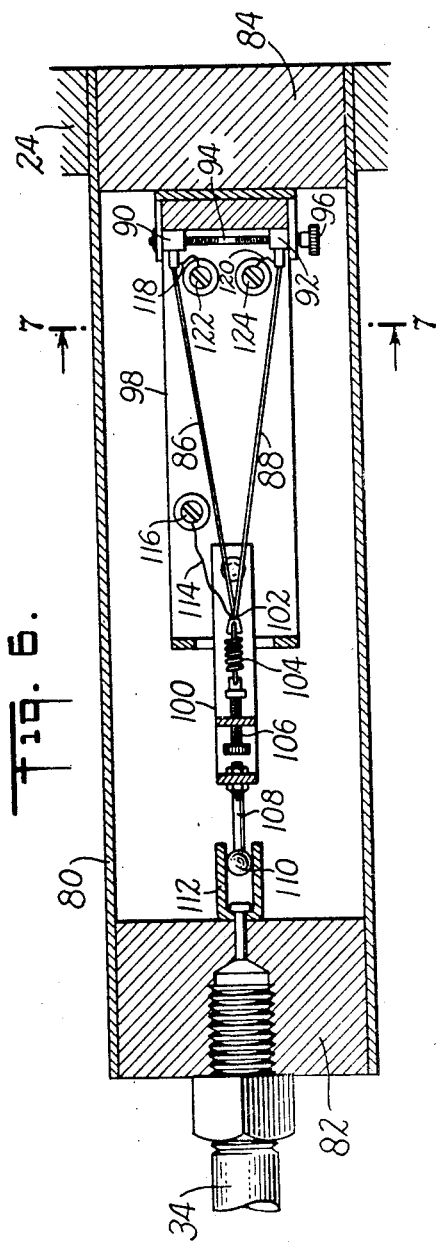

Patented Feb. 1, 1949

2,460,503

UNITED STATES PATENT OFFICE 2,460,503

APPARATUS FOR MEASURING LIQUID LEVEL OR SPECIFIC GRAVITY

Wilfred H. Howe, Sharon, Mass., assignor to The Foxboro Company, Foxboro, Mass., a corporation of Massachusetts Application February 26, 1945, Serial No. 579,721

6 Claims. (Cl. 73—33)

This invention relates to apparatus for measuring and indicating, recording or controlling the level or specific gravity of a liquid, liquid mixture or suspension of solids in a liquid, all of which are herein referred to as liquids. More particularly, the invention relates to apparatus for measuring the buoyancy of a float that is at least partially immersed in a liquid, as a measure of the specific gravity or level of the liquid.

The level of a liquid is commonly measured by use of the well-known gauge glass wherein the liquid level is determined by a direct observation. There are, however, a number of situations in which it is inconvenient or impossible to use the conventional gauge glass. Thus there are cases where it is desired to have an indication of liquid level in a tank or other vessel at a point remote from the tank and perhaps a considerable distance above or below the tank. It is apparent that in such cases a gauge glass cannot well be used.

In one conventional method of determining the specific gravity of a liquid a float of predetermined mass and volume is submerged in the liquid whose specific gravity is to be determined, and the apparent weight of the submerged float is measured as a measure of the specific gravity of the liquid. The apparent weight of the float will differ from its known actual weight by an amount equal to the weight of the liquid displaced by the float. As the volume of the float and its true weight are known, the apparent weight of the float becomes a direct measurement of the specific gravity of the liquid in which the float is submerged.

Various methods have been used in the past to determine the apparent weight of such a float. It is an object of the present invention to provide novel apparatus including one or more electrical strain sensitive elements for measuring the apparent weight of a float submerged in a liquid and thereby determining the specific gravity of the liquid.

It is another object of the invention to provide apparatus for measuring the level of a liquid by means of a float floating on the surface of the liquid.

It is still another object of the present invention to provide improved apparatus for measuring and indicating, recording or controlling the level or specific gravity of a liquid, which apparatus is highly resistant to corrosion and is not undesirably affected by variation in static pressure.

It is a further object of the invention to provide apparatus for measuring the level or specific gravity of a liquid of such a character that an accurate indication of the liquid level or specific gravity may be obtained at a point remote from the point of measurement.

It is still another object of the invention to provide apparatus for accurately measuring the liquid level or specific gravity of a liquid under high pressure.

Other objects of the invention will be in part obvious and in part pointed out hereafter.

The apparatus shown in the drawings comprises, in general, a float which, in cases where the liquid level is to be measured, is so selected as to weight and volume that it will float approximately half submerged in the liquid of which the level is to be measured. In cases where the specific gravity of the liquid is to be measured, a float is completely submerged in the liquid. In either case the float is rigidly connected to a flexure member in such manner that as the level or specific gravity of the liquid changes, the resulting change in buoyancy of the float creates a force that is applied to the flexure member to bend it. This variation in the buoyancy of the float is measured by measuring the strain it produces in the flexure member.

Apparatus incorporating a preferred embodiment of the present invention as applied to the problem of measuring liquid level is illustrated in the accompanying drawings. It will be apparent to those skilled in the art from the foregoing statements that essentially the same apparatus can be used for measurement of specific gravity provided that the float is maintained completely submerged in the liquid, or if the float is only partially immersed, that the liquid level be maintained constant.

Figure 1 is a sectional elevational view showing a float and flexure member having an electrical strain gage element mounted thereon;

Figure 2 is an enlarged vertical section of the flexure member taken along the lines 2—2 of Figure 1;

Figure 3 is an enlarged top plan view of a portion of the axial core of the flexure member showing certain details of the electrical strain gage element;

Figure 4 is an electrical circuit that may be used to measure variations in the resistance of the strain gage element;

Figure 5 is a top plan view partly in section of another form of flexure member;

Figure 6 is a vertical section taken on the line 6—6 of Figure 5 and showing further details of the flexure member of Figure 5;

Figure 7 is an enlarged vertical section taken on the line 7—7 of Figure 6.

Referring to the drawings and particularly to Figure 1, numeral 10 designates a tank or other vessel containing a body of liquid of which the level is to be measured. The tank 10 is connected by pipes 12 and 14 to a conventional float chamber 16 in such manner that when the level in the tank is at the desired point, liquid rises to approximately the midpoint of the float chamber 16 as indicated at 18. The chamber 16 at a point above the liquid level 18 is provided with a flanged connection 20 to which is bolted a frusto-conical collar 22. The opening at the right-hand end of collar 22 is closed by a plate 24 which is bolted to the collar 22 and has mounted in fixed relation thereto one end of a flexure member or cantilever 26.

At its other end the flexure member 26 is connected to a float 28, preferably selected to float half submerged in the body of liquid in the chamber 16 when the liquid half fills the chamber. That is, when the liquid in the chamber is at mid-position, the float exerts neither an upward nor a downward force on the flexure member 26. The float 28 is provided with a depending extension 30 that passes through a perforated plate 32 fixed to the wall of chamber 16. The purpose of the plate 32 is to maintain the float properly centered within the float chamber when the float is buoyed up by the rising level; and to act as a baffle to prevent or minimize the effect of surges of liquid on the float. A guide plate 31 fixed to the casing of float chamber 16 surrounds the upper portion of float 28 to provide additional support and guidance for the float. The arrangement is such that variation of the liquid level varies the buoyant force it exerts on the float held by the flexure member, and the float in turn flexes the flexure member 26.

The flexure member 26 comprises a rod 34 connected at one end to the top of float 28 and at its other end threaded into the rigid core 36. Referring now additionally to Figures 2 and 3, the core 36 comprises cylindrical end portions 40 and 42 and a neck 44 extending therebetween. The central portion of the neck 44 is cut away at the top and bottom to provide a less rigid section 46 of approximately rectangular cross section commonly called a "flexure." The core 36 may be protected from the atmosphere of the liquid by a flexible cover tube 38, preferably made of a relatively flexible material such as rubber, suitable plastic, or the like, or alternatively may be a metal bellows. Additional protection may be provided at the left-hand end of the tube 38 by a flexible diaphragm 39 of similar material. The diaphragm is clamed between the flanged connection 20 and collar 22 in such manner as to seal off the space between tube 38 and collar 22 and prevent liquid or vapor from the chamber 16 from entering this space.

Mounted on the top and bottom of the flexure 46 are a pair of electrical strain gage elements 48 and 50 that may be generally of the type shown in the United States Patent 2,292,549 to Edward E. Simmons, Jr. The elements 48 and 50 preferably comprise a winding of fine electrical resistance wire suitably bonded to a thin supporting sheet which is in turn bonded to the flexure 46. The wire used is preferably of the order of a mil in diameter. As shown in Figures 2 and 3, the element 48 comprises a double filament of resistance wire 52 arranged in an elongated sinuous pattern on a piece of thin paper 54 and bonded to the paper with an adhesive such as a glyptal resin in such manner that each segment of the wire throughout its effective length is firmly bonded to the paper. It is desirable that a double filament be used to minimize or eliminate undesirable inductive effects if alternating current is used to measure the resistances of the elements.

The paper 54 having the winding of resistance wire thereon is then firmly bonded to the top of flexure 46 with the lengths of resistance wire parallel to the axis of the flexure member 26 so that as the flexure 46 is strained, the resistance wire 52 is proportionally strained and its resistance thereby varied.

The element 50 is constructed similarly to the element 48 and is similarly bonded to the bottom of flexure 46. It is apparent that with the construction described above force exerted by the float 28 in response to changes in liquid level will strain the flexure member 26. Because of the configuration of the flexure 46, a major portion of the strain of the member 26 will occur in the flexure. If the liquid level moves downwardly, float 28 may be caused to exert a downward force on the end of flexure member 26, and element 48 will be put under tension and its electrical resistance thereby increased; whereas the element 50 will be put under compression and its electrical resistance thereby decreased. If, on the other hand, the liquid level moves upwardly, float 28 may be caused to exert an upward force and the element 48 will be compressed thereby decreasing its resistance, whereas element 50 will be stretched and its resistance increased. The buoyancy of the float 28 is desirably selected in such manner that when the liquid level 18 is at the desired point the flexure member 26 is in unstressed condition. The change in resistance of the elements 48 and 50 as they are strained then becomes a measure of the departure of the liquid level from a desired predetermined value and the resistances of the elements 48 and 50 may be measured to determine variations in the liquid level. Since the elements 48 and 50 are bonded to the flexure 46 throughout their effective length, the elements will be uniformly strained as the flexure 46 bends.

Referring now to Figures 1 and 4, the elements 48 and 50 are connected to a resistance measuring device 55. Various resistance measuring devices well-known in the art may be used, but for purposes of illustration a simple measuring circuit is shown in Figure 4. As shown in Figure 4 the elements 48 and 50 are placed in adjacent arms of a Wheatstone bridge, the other two arms of the bridge containing a fixed resistance 56 and a variable resistance 58. A galvanometer 60 is connected across the bridge between the common lead of the elements 48 and 50, and the common connection of resistances 56 and 58. Electrical energy from a suitable source such as the battery 62 is supplied to the other two corners 64 and 66 of the bridge. The elements 48 and 50 are connected in the bridge in such manner that they are effectively in opposed relation and hence the effects of their resistance changes are additive.

As the elements 48 and 50 are strained and their resistances thereby varied the bridge is unbalanced and the needle of galvanometer 60 deflects. The variable resistance 58 is then adjusted to bring the galvanometer needle back to its zero or null position.

Referring now to Figure 1, the needle 68 of galvanometer 60 is shown as cooperating with a scale 70 having a zero or null point 72. The knob 74 is mechanically interconnected with the variable resistance 58 and is provided with an index 76 that cooperates with a stationary reference scale 78. When the bridge becomes unbalanced, knob 74 may be rotated to bring needle 68 back to the null position 72. Since the elements 48 and 50 are connected in opposition to one another, the setting of resistance 58 is proportional to the arithmetic sum of the changes in resistance of the elements and the extent to which the knob 74 must be rotated to rebalance the bridge is a measure of the departure of the liquid level from its initial position. The reference scale 78 may be calibrated directly in terms of liquid level, in which case the index 76 indicates on scale 78 the level of the liquid in tank 10.

It is to be understood that the measuring circuit shown in Figure 4 described above is included for purposes of illustration only. The variation in resistance of elements 48 and 50 is in many cases not very great and hence to obtain the required accuracy of measurement it may be desirable in some cases to use more elaborate measuring devices that are capable of giving considerably more accuracy than the device described above. One type of measuring apparatus that may be used with particular advantage in conjunction with apparatus embodying the present invention is disclosed in a copending application of Wilfred H. Howe and Robert W. Cushman, Serial No. 496,438, filed July 28, 1943.

It may be noted that variations in the resistance of the strain responsive elements 48 and 50 may be used to control the liquid level in tank 10. Thus the elements 48 and 50 may be connected to a potentiometer controller of any suitable and well-known type or an electronic instrument such as that shown in the above-identified Howe et al. application to adjust a valve in a pipe through which flows a fluid affecting the level of liquid in tank 10.

Referring now to Figures 5, 6, and 7, showing an alternative construction, the float 28 is caused to vary the strain on the strain sensitive elements by moving up and down wih the rise and fall of the liquid level. The float is not rigidly supported, but is movably supported by the rod 34 which is in turn fixed to end block 82. This block is supported in the left end of a flexible member or tube 80, which is similar to tube 38, and which is firmly fixed at its right-hand end in plate 24. The ends of tube 80 are closed by the blocks 82 and 84 to form an enclosed space within this tube containing a modified form of flexure member, i. e., the electrical strain gage elements themselves comprise the flexure member. The elements, comprising the resistance wires 86 and 88, are arranged in the form of a V as best shown in Figure 6. At their right-hand end the wires 86 and 88 are connected to the adjustable blocks 90 and 92 which are mounted on and internally threaded to receive the threaded shaft 94. The shaft 94 is provided with right-handed and left-handed threads so that as the shaft is rotated the blocks 90 and 92 move towards each other or away from each other depending upon the direction of rotation of the shaft. At the lower end of shaft 94 there is a knob 96 by means of which the distance between the blocks 90 and 92, and hence the distance between the right-hand ends of wires 86 and 88 may be adjusted. Shaft 94 is mounted in a frame 98 which is fixed to the block 84.

The junction of the wires 86 and 88 at the apex of the V is connected to a double U-shaped member 100 pivotally supported in the frame 98 in such manner that as rod 34 is moved by the float 28 in response to changes in liquid level, the junction 102 moves upwardly or downwardly to elongate one of the wires 86 and 88 and to release a part of the tension in the other wire to permit it to contract. The junction 102 of the wires 86 and 88 is connected to the pivoted member 100 through a light spring 104 and an adjusting screw 106 which permits adjustment of the tension on the wires. Secured to the pivoted U-shaped member 100 there is a rod 108 having a spherical end 110 located between the arms of a U-shaped member 112 which is fixed to the block 82.

The midsection of tube 80 may be of a metal bellows construction to provide such flexibility that practically all the motion imparted to the rod 34 by the float 28 is transmitted to the pivoted member 100.

The operation of the flexure means of Figures 5 and 7 is apparent from the above description. If the liquid level in float chamber 16 rises, it carries the float upward, thus moving U-shaped member 112, sphere 110 and pivoted member 100 upwardly. Junction 102 will move upwardly to increase the tension in the wire 88, thus increasing its resistance, and to decrease the tension in wire 86, thus reducing its resistance. When the liquid level drops, the resistance of wire 86 will increase correspondingly and the resistance of wire 88 will decrease correspondingly. The junction 102 is connected by a wire 114 to the binding post 116 and the right-hand ends of resistance elements 86 and 88 are connected by the wires 118 and 120 to the binding posts 122 and 124 respectively. The binding posts 116, 122, and 124 are connected respectively to the leads 126, 128, and 130 which pass through the conduit 132 in block 84. Variations in the resistances of arms 86 and 88 may be measured and an indication of liquid level obtained in the manner described in connection with Figures 1 through 4, i. e., by connecting the resistances 86 and 88 in the arms of a suitable Wheatstone bridge circuit.

To protect the flexure member 26 (Figure 1) and the flexible tube 80 and its associated parts (Figure 5) from the weight or buoyancy of the float 28, when the liquid level in tank 10 is not within the measuring range of the apparatus, movement limiting means is provided (Figure 1) in the form of a suitable stop 150. The stop shown comprises an angular shank suitably supported and terminating in a sleeve like member 151 having an elongated opening 152 receiving the rod 34. The rod is free to move within the opening 152 until it reaches the upper and lower surfaces thereof, whereupon the stop prevents further movement of the rod 34 and float 28. Referring to Figure 1, the length of the slot is such as to prevent any force exerted by the float that would excessively strain the flexure member 26; whereas in the Figure 5 construction, the length of the slot is such as to prevent any movement of the float that would damage the tube 80 and its associated parts.

From the above description it is apparent that the apparatus of the present invention is particularly well adapted for measuring liquid level in those cases where it is inconvenient or impossible to use the conventional type of gauge glass. Also essentially the same apparatus may be used in the measurement of specific gravity. With apparatus as described above, the indication of liquid level or specific gravity may be obtained at a remote point and the liquid level or specific gravity of a liquid under high pressure may be measured with advantage since the electrical measuring element may be located inside the pressure chamber.

Since many embodiments might be made of the present invention and since many changes might be made in the embodiment described above, it is to be understood that the foregoing description is to be interpreted as illustrative only and not in a limiting sense.

I claim:

1. In apparatus for measuring the buoyancy of a float at least partially immersed in a liquid as a measure of a characteristic of said liquid such as specific gravity and liquid level, in combination, a flexure member, one end of which is rigidly mounted in a fixed support and the other end of which is connected to said float whereby variations in the force exerted by said float in response to variations in the value of said characteristic flex said flexure member, a first resistance element fixed to the top of said flexure member, a second resistance element fixed to the bottom of said flexure member, said resistance elements being so fixed to said member that they are strained as said member is flexed and their electrical resistances are thereby varied, means responsive to the arithmetic sum of the changes in the electrical resistance of said elements for indicating the value of said characteristic of said liquid, and flexure means for sealing said elements from the atmosphere of the liquid.

2. In apparatus for measuring the buoyancy of a float at least partially immersed in a liquid as a measure of a characteristic of said liquid such as specific gravity and liquid level, in combination, a flexure member having one end fixed to a rigid support and connected at its other end to said float whereby variations in the force exerted by said float in response to variations in the value of said characteristic flex said flexure member, a resistance element connected to spaced points on said flexure member to cause said element to be strained and its electrical resistance thereby varied as said flexure member is flexed, a closed flexible protecting tube surrounding said flexure member and said resistance element to protect said flexure member and resistance element from said liquid and its vapor, and means responsive to the electrical resistance of said element for indicating the value of said characteristic of said liquid.

3. In apparatus for measuring the buoyancy of a float at least partially immersed in a liquid as a measure of a characteristic of said liquid such as specific gravity and liquid level, in combination, a flexure member rigidly supported at one end and connected near its other end to said float to cause the buoyancy of said float to flex said flexure member, an electrical resistance element fixed to said flexure member throughout the length of said resistance element to cause said element to be uniformly strained throughout its length and its electrical resistance thereby varied as said flexure member is flexed, and means responsive to changes in the electrical resistance of said element for indicating the value of said characteristic of said liquid.

4. In apparatus for measuring the buoyancy of a float at least partially immersed in a liquid as a measure of a characteristic of said liquid such as specific gravity and liquid level, in combination, a cantilever connected near its free end to said float to cause the buoyancy of said float to flex said cantilever, a first electrical resistance element fixed to the top of said cantilever, a second electrical resistance element fixed to the bottom of said cantilever, said resistance elements being so fixed to said cantilever that they are strained as said cantilever is strained and their resistances are thereby varied, and means responsive to changes in the electrical resistances of said resistance elements for indicating the value of said characteristic of said liquid.

5. In apparatus for measuring the buoyancy of a float at least partially immersed in a liquid as a measure of a characteristic of said liquid such as specific gravity and liquid level, in combination, a cantilever connected near its free end to said float to cause the buoyancy of said float to flex said cantilever, a first electrical resistance element fixed to the top of said cantilever, a second electrical resistance element fixed to the bottom of said cantilever, said resistance elements being so fixed to said cantilever that they are strained as said cantilever is strained and their resistances are thereby varied, and means responsive to the arithmetic sum of the changes in the electrical resistances of said resistance elements for indicating the value of said characteristics of said liquid.

6. In apparatus for measuring the buoyancy of a float at least partially immersed in a liquid as a measure of a characteristic of said liquid such as specific gravity and liquid level, in combination, a cantilever connected near its free end to said float to cause the buoyancy of said float to strain said cantilever, said cantilever including a flexure section of reduced cross-sectional area in which most of the strain of said cantilever is concentrated as said cantilever is flexed, an electrical resistance element connected to spaced points on said flexure section to cause said resistance element to be strained and its resistance thereby varied as said cantilever is strained, and means responsive to changes in the electrical resistance of said element for indicating the value of said characteristic of said liquid.

WILFRED H. HOWE.

REFERENCES CITED

The following references are of record in the file of this patent:

UNITED STATES PATENTS

| Number | Name | Date |
| --- | --- | --- |
| 1,829,489 | Mularkey | Oct. 27, 1931 |
| 2,248,322 | Annin | July 8, 1941 |
| 2,329,541 | Kuehni | Sept. 14, 1943 |
| 2,351,101 | Brelsford | June 13, 1944 |
| 2,359,245 | Ritzman | Sept. 26, 1944 |
| 2,360,886 | Osterberg | Oct. 24, 1944 |

FOREIGN PATENTS

| Number | Country | Date |
| --- | --- | --- |
| 10,992 | Great Britain | 1905 |